United States Patent
Meynen et al.

(10) Patent No.: US 12,372,814 B2
(45) Date of Patent: Jul. 29, 2025

(54) RX ADD-ON FOR GLASSES

(71) Applicant: Essilor International, Charenton-le-Pont (FR)

(72) Inventors: Mathieu Meynen, Charenton-le-Pont (FR); Marc Reignault, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 827 days.

(21) Appl. No.: 17/628,764

(22) PCT Filed: Jul. 31, 2020

(86) PCT No.: PCT/EP2020/071615
§ 371 (c)(1),
(2) Date: Jan. 20, 2022

(87) PCT Pub. No.: WO2021/019063
PCT Pub. Date: Feb. 4, 2021

(65) Prior Publication Data
US 2022/0269112 A1    Aug. 25, 2022

(30) Foreign Application Priority Data
Jul. 31, 2019    (EP) ...................................... 19305995

(51) Int. Cl.
*G02C 9/04*    (2006.01)
*G02C 1/00*    (2006.01)

(52) U.S. Cl.
CPC ................. *G02C 9/04* (2013.01); *G02C 1/10* (2013.01); *G02C 2200/02* (2013.01)

(58) Field of Classification Search
CPC ... G02C 9/04; G02C 9/00; G02C 1/10; G02C 1/06; G02C 2200/02; G02C 2200/08;
(Continued)

(56) References Cited

U.S. PATENT DOCUMENTS 6,334,681 B1 *    1/2002    Perrott ................... G02C 7/086
351/159.01
6,592,220 B1    7/2003    Cheong
(Continued)

FOREIGN PATENT DOCUMENTS

CN    205139503 U    4/2016
CN    208060890 U    11/2018
(Continued)

OTHER PUBLICATIONS

International Search Report mailed on Nov. 9, 2020 in PCT/EP2020/071615 filed on Jul. 31, 2020 (3 pages).
(Continued)

*Primary Examiner* — Stephone B Allen
*Assistant Examiner* — Adam W Booher
(74) *Attorney, Agent, or Firm* — Oblon, McClelland, Maier & Neustadt, L.L.P.

(57) ABSTRACT

The present disclosure includes an optical article for use with an eyewear apparatus. In some implementations, the optical article includes a single optical member having opposing first and second lens surfaces and a magnet coupled to the optical member and configured to be coupled to a frame of an eyewear apparatus. The optical article may also include a mounting bracket coupled to the optical member and configured to be coupled to the frame of the eyewear apparatus.

15 Claims, 5 Drawing Sheets

(58) Field of Classification Search
CPC .......... G02C 7/08; G02C 7/086; G02C 7/088; G02C 7/10
USPC .............................................. 351/47, 57, 86
See application file for complete search history.

(56) References Cited

U.S. PATENT DOCUMENTS

| | | |
|---|---|---|
| 2002/0029408 A1 | 3/2002 | Lindahl |
| 2006/0101629 A1* | 5/2006 | Kvartler ................ B24B 13/005 29/26 A |
| 2006/0203187 A1* | 9/2006 | Pieterman ................ G02C 9/00 351/57 |
| 2008/0088791 A1* | 4/2008 | Smith ...................... G02C 9/00 351/57 |
| 2013/0235325 A1 | 9/2013 | Crescenzi et al. |
| 2013/0271722 A1 | 10/2013 | DiChiara |
| 2016/0223840 A1 | 8/2016 | Chute et al. |

FOREIGN PATENT DOCUMENTS

| | | |
|---|---|---|
| DE | 10 2015 226 714 A1 | 3/2016 |
| EP | 550 898 A1 | 7/2005 |
| WO | WO 2015/054799 A1 | 4/2015 |
| WO | WO 2016/124866 A1 | 8/2016 |

OTHER PUBLICATIONS

European Office Action issued Jun. 26, 2023 in European Application No. 19305995.3, 6 pages.
Combined Chinese Office Action and Search Report issued Aug. 29, 2024, in corresponding Chinese Patent Application No. 202080054731.8 (with English Translation), 18 pages.

* cited by examiner

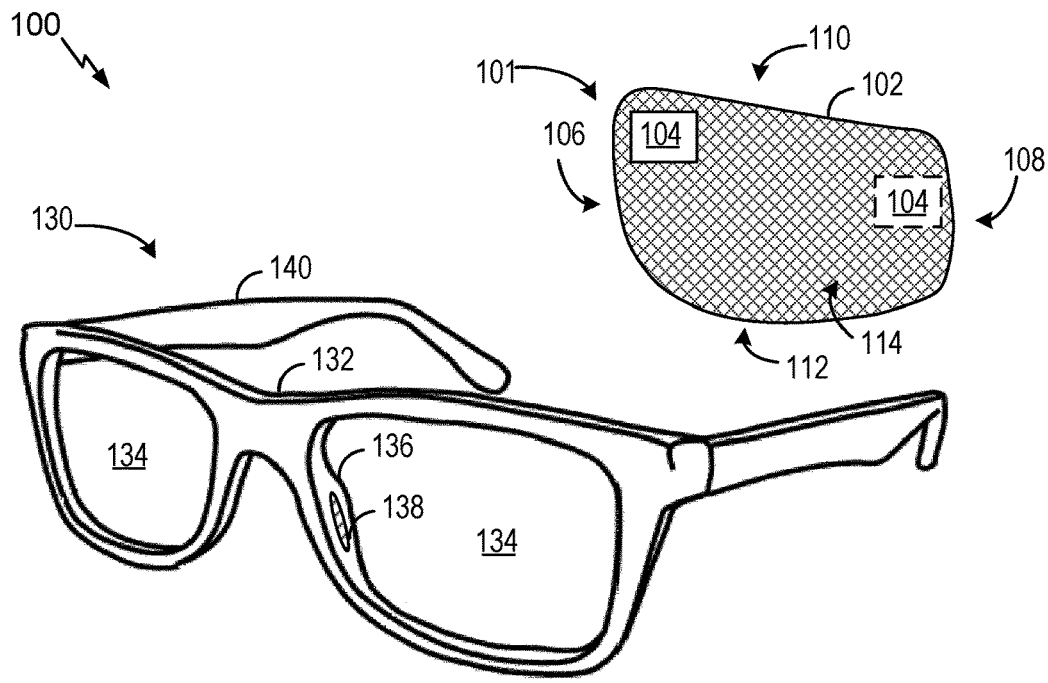
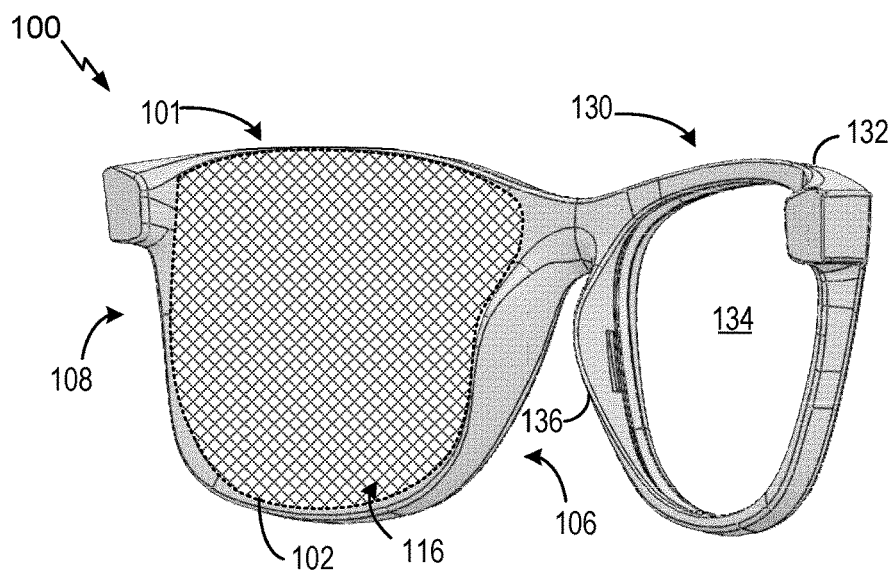
FIG. 1A
FIG. 1B

FIG. 3A
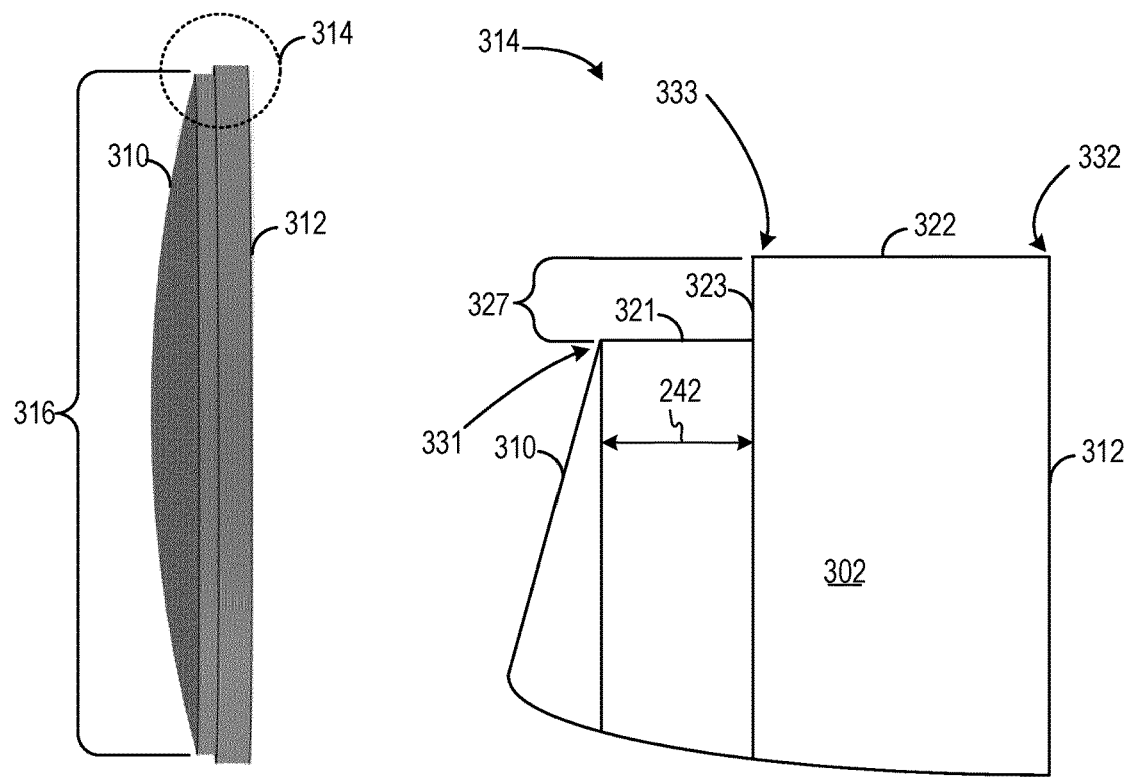
FIG. 3B  FIG. 3C

RX ADD-ON FOR GLASSES

TECHNICAL FIELD

The present invention relates generally to optical articles and, more particularly but without limitation, to an optical article for use with an eyewear apparatus.

BACKGROUND

Optical articles, such as lenses, can be used to correct refractive errors of the eye, such as, for example, myopia, hyperopia, presbyopia, and astigmatism. When a user of an optical article (e.g., a prescription lens) wants to wear sunglasses, the user can use prescription sunglasses or wear contact lenses and use non-prescription sunglasses. Accordingly, a user must purchase multiple pairs of sunglasses.

Some conventional approaches to provide greater flexibility to the user have included providing a sunglass attachment for prescription glasses. Such sunglass attachments are typically attached to the front of the prescription glasses using magnets or clips. However, when magnets are used to couple a sunglass attachment, the manufacturing process for making such attachments and corresponding prescription frames can be complicated and expensive. When clips are used to couple a sunglass attachment, such clips (or hooks) may be noticeable by other individuals and, therefore, may not be atheistically appealing to a user. Another approach was described in in Korean Patent No. 20160140139 in which a film including a pair of lenses is attached to a pair of sunglasses using receiving grooves formed in the film which are coupled to engagement grooves formed inside hinge protrusions of the sunglasses. However, the approach of Korean Patent No. 20160140139 requires a complex, a specific, and specialized fabrication process and the attachment means (e.g., receiving grooves) may be easily broken.

Thus, users of prescription lenses who also use contacts are left to select from a variety of suboptimal products or spend money to acquire both prescription and non-prescription glasses.

SUMMARY

The present disclosure includes apparatuses, systems, and method for associated with an optical article for use with an eyewear apparatus. For example, an optical article includes an optical member having opposing first and second lens surfaces. The optical member may be a full backside (FBS) lens or a dual side lens, as illustrative, non-limiting examples. In some implementations, the optical member is a single optical member, such as a single prescription lens. The optical article also includes one or more attachment devices configured to removably couple optical article with the eyewear apparatus, such as with a frame of the eyewear apparatus. The one or more attachment devices may include a magnet, a mounting bracket, or both, as illustrative, non-limiting examples. The one or more attachment devices may be configured to enable positioning and./or alignment of the optical article with respect to one or more lenses of eyewear apparatus by the user—e.g., without the assistance by an optician. A user may selectively couple/decouple the optical article to the eyewear apparatus as needed. For example, when the user wears contact lenses, the user may remove the optical article from the eyewear apparatus and wear with eyewear apparatus without the optical article. Alternatively, if the user is not wearing contact lenses, the user may couple the optical article to the eyewear apparatus and wear the eyewear apparatus with the optical article. Thus, the optical article enables and/or provides versatility to an eyewear apparatus such that a user does not need to own both prescription and non-prescription versions of an eyewear apparatus, thereby reducing a cost to the user.

Additionally, an optical article may include or correspond to a prescription for a single eye, such that a user may have a first optical article for a first eye and a second optical. Accordingly, the optical articles enable management of different prescriptions such that an optical article can be replaced as a prescription for an eye changes. Further, in implementations where the optical article includes a single prescriptive lens, a weight of the optical article (or two optical articles) may be less as compared to a solution in which a single optical article includes two prescriptive lens that are coupled to an eyewear apparatus—e.g., a described in Korean Patent No. 20160140139. Additionally, as compared to the optical article of Korean Patent No. 20160140139 which require a specific, specialized fabrication process, the optical articles of the present disclosure may be produced using a standard lens process (e.g., molding, casting, surfacing), thereby simplifying manufacturing and reducing costs and time to manufacture.

An eyewear apparatus may be configured for use with the optical articles described herein. For example, the eyewear apparatus may include one or more attachment devices for coupling with the one or more attachment device of the optical article. To illustrate, the eyewear apparatus may include a magnet (positioned in temporal area of a frame), a notch positioned on nose pad and/or on a frame, or a combination thereof, as illustrative, non-limiting examples. Accordingly, the one or more attachment devices of the eyewear apparatus may enable a user to securely and selectively configure the eyewear apparatus as a prescription eyewear apparatus or as a non-prescription eyewear apparatus.

In some implementations, an optical article may include an optical member (e.g., a lens) and a support structure. For example, the support structure, such as a ring, may be coupled to the optical member and may include or be coupled to one or more attachment devices. To illustrate, at least a portion of the support structure may be positioned in a channel of the optical member and the one or more attachment devices may be coupled to the optical member via the support structure. The support structure may be used to couple to the optical member to an eyewear apparatus and may allow the optical member to be used with a large range of prescriptions. For example, for prescriptions that are highly negative, the radii of the lens (e.g., the optical member) is small and the distance between the lens and the eye is small. As a result, the eyelashes may potentially touch the prescription lens. Using the support structure allows highly negative prescription lenses (e.g., the optical member) to be used by increasing the width between inner and outer surface of the support structure. Alternatively, the support structure may be designed to coupled highly positive prescription lenses to an eyewear apparatus without the optical member interfering with lenses of an eyewear apparatus or a wearer's eyelashes. In other words, the support structure (or an exposed portion of the support structure when coupled to the optical member) may be customizable based on the prescription of the optical member and a frame of the eyewear apparatus. Additionally, the support structure allows for easy replacement of cracked or damaged lenses (e.g., the optical member). A user may attach or remove the support structure to easily exchange the optical member without the need to for professional service, such as by an optician, ophthalmologist, optometrists, or the like. Additionally, or alternatively, different support structures can be coupled to the optical member for use of the optical member with different eyewear apparatuses.

In some implementations, the optical article includes a first portion 312 comprising a first portion (e.g., a lens portion) and a second portion (e.g., an extension portion) ex extending from a side surface of the first portion. The extension portion may define a ledge formed by at least one side surface of the optical article. The ledge may enable a small gap to be present between a first surface (e.g., a front surface) of the optical member and a lens of the eyewear apparatus. Such positioning may make use of optical article 300 less noticeable as compared to an eyewear apparatus without the optical article 300. Additionally, or alternatively, as compared to optical article 200, optical article 300 include a unitary design having a reduce number of components, which may be faster to manufacture, have a reduced cost, and may have tighter tolerance control providing a secure fit between the optical article 300 and a frame. Additionally, a small gap may make use of optical article less noticeable as compared to an eyewear apparatus without the optical article.

In one aspect of the disclosure, an apparatus (e.g., an optical article) for use with an eyewear apparatus includes a single optical member having opposing first and second lens surfaces. The optical article may further includes a magnet coupled to the optical member and configured to be coupled to a frame of an eyewear apparatus. The optical article may also include a mounting bracket coupled to the optical member and configured to be coupled to the frame of the eyewear apparatus.

In some implementations of the foregoing apparatuses, the optical article further includes a support structure coupled to the optical member. The optical member may be coupled to the magnet via the support structure, the mounting bracket may be coupled to or unitary with the support structure, or both.

In some implementations of the foregoing apparatuses, the optical member includes a channel formed via a side surface of the optical member. The side surface may be positioned between the first and second lens surfaces. In some such implementations, at least a portion of the support structure is positioned within the channel. A size, a shape, or both of the support structure may be based on one or more characteristics of the frame of the eyewear apparatus. In some implementations, the support structure may include a ring structure, at least a portion of which is positioned within the channel of the optical member. Additionally, or alternatively, the magnet, the mounting bracket or both, may be coupled to or in contact with the support structure.

In some implementations of the foregoing apparatuses, the optical member includes a first portion and a second portion. The first portion may include a lens including the first and second lens surfaces. Additionally, or alternatively, the second portion may extend from a side surface of the first portion. The side surface may be positioned between the first and second lens surfaces. In some implementations, the second portion is coupled to the magnet and coupled to or includes the mounting bracket.

In some implementations of the foregoing apparatuses, the optical member includes a prescription lens. In some such implementations, the optical member is configured to be coupled to a user facing side of the frame using the magnet and the mounting bracket. Additionally, or alternatively, to couple the optical member to the frame, the magnet is configured to be positioned in a first cavity of the frame, at least a portion of the mounting bracket is configured to be positioned within a second cavity of the frame, or both.

In some implementations of the foregoing apparatuses, an eyewear apparatus is configured to be coupled to the optical member. In some such implementations, the eyewear apparatus may include a frame having a first side and a second side. The second side may be a user facing side. In some implementations, the frame includes a nose pad having a cavity configured to receive the mounting bracket arm of the optical member, a magnet coupled to the second side and configured to be coupled with the magnet of the optical member, or both. Additionally, or alternatively, the eyewear apparatus may include one or more lenses coupled to the optical frame and each of the one or more lenses may be distinct from the optical member. The eyewear apparatus ma include an apparatus select from the group consisting of glasses, spectacles, sunglasses, safety glasses, or goggles.

In another aspect of the disclosure, an apparatus (e.g., an eyewear apparatus) includes a frame having a first side and a second side. The second side may be a user facing side. The frame may define a cavity configured to receive a mounting bracket arm of an optical member, include magnet coupled to the second side and configured to be coupled with a magnet of the optical member, or both. In some implementations, the cavity is formed in a nose pad of the frame.

In some implementations of the foregoing apparatuses, the apparatus (e.g., the eyewear apparatus) includes one or more lenses coupled to the optical frame. Each of the one or more lenses may be distinct from the optical member. In some such implementations, the eyewear apparatus is an apparatus is select from the group consisting of glasses, spectacles, sunglasses, safety glasses, or goggles.

In some implementations of the foregoing apparatuses, the optical article includes a single optical member having opposing first and second lens surfaces. In some such implementations, the optical member includes a magnet coupled to the optical member and configured to be coupled to the frame of the eyewear apparatus, a mounting bracket coupled to the optical member and configured to be coupled to the frame of the eyewear apparatus, or both.

In another aspect of the disclosure, a method of forming one or more optical devices may include forming a single optical member having opposing first and second lens surfaces. The method may also include coupling a magnet to optical member. The magnet may be configured to be coupled to a frame of an eyewear apparatus. The method may further include providing a mounting bracket coupled to the optical member. The mounting bracket may be configured to be coupled to the frame of the eyewear apparatus.

In some implementations of the foregoing methods, forming the optical member includes receiving a wafer and forming the optical member from the wafer. Additionally, or alternatively, providing the mounting bracket may include forming the mounting bracket from the wafer, or coupling a support structure including the mounting bracket to the optical member.

In some implementations of the foregoing methods, the method further includes forming a channel in a side surface of the optical member. The side surface may be positioned between the first and second lens surfaces. In some such implementations, the method includes positioning at least a portion of a support structure within the channel. The optical member may be coupled to the magnet, the mounting bracket, or both, via the support structure.

In some implementations of the foregoing methods, forming the optical member further includes forming a first portion including a lens including the first and second lens surfaces. In some such implementations, forming the optical member further includes forming a second portion extending from a side surface of the first portion. The side surface may be positioned between the first and second lens surfaces. In some implementations, the first portion and the second portion are formed using a milling machine.

In some implementations of the foregoing methods, the method further includes forming the frame of the eyewear apparatus. The frame may have a first side and a second side. In some such implementations, the second side is a user facing side. In some implementations, forming the frame may include coupling a magnet to the second side, forming a cavity, or both. The cavity may be configured to receive at least a portion of the mounting bracket of the optical member. In some such implementations, the cavity may be defined by the frame of the eyewear apparatus. Additionally, or alternatively, the cavity may be defined by a nose pad of the frame. In some such implementations, the node pad is coupled to or unitary with the frame.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise.

The term "about" as used herein can allow for a degree of variability in a value or range, for example, within 10%, within 5%, or within 1% of a stated value or of a stated limit of a range, and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any implementation of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

Some details associated with the implementations are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale, unless otherwise noted, meaning the sizes of the depicted elements are accurate relative to each other for at least the implementation in the view.

FIG. 1A is a first perspective view of an optical system in a first configuration.

FIG. 1B is a second perspective view of the optical system of FIG. 1A in a second configuration.

FIG. 3A is a front view of another example of an optical article.

FIG. 3B is a side view of an example of the optical article of FIG. 3A.

FIG. 3C is an enlarged view of a portion of the optical article of FIG. 3B.

DETAILED DESCRIPTION

Figure 2A:
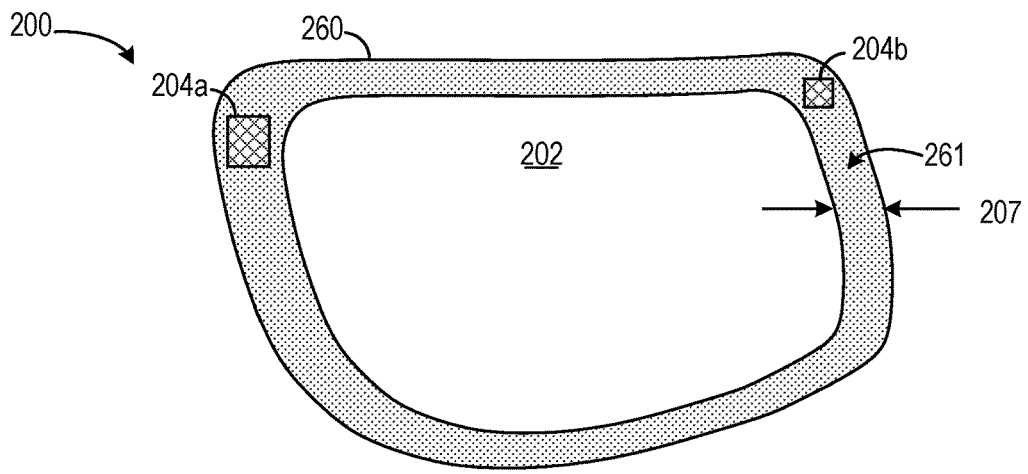
FIG. 2A is a front view of an example of an optical article.

Referring to FIGS. 1A and 1B, perspective views of different configurations an optical system is shown and generally designated as 100. For example, FIG. 1A is a first perspective view (e.g., a front perspective view) of an optical system in a first configuration (e.g., an uncoupled state), and FIG. 1B is a is a second perspective view (e.g., a rear perspective view) of the optical system of FIG. 1A in a second configuration (e.g., a coupled state).

As shown in FIGS. 1A and 1B, optical system 100 includes an optical article 101 and an eyewear apparatus 130. In some implementations, optical article 101 may be configured to couple to eyewear apparatus 130, such as sunglasses. As described further herein, optical article 101 is configured to be removable coupled with eyewear apparatus 130. To illustrate, as an illustrative, non-limiting example, optical article 101 may include a prescription lens (e.g., an "add-on" prescription lens) that is configured to be coupleable to eyewear apparatus 130, such as a pair of sunglasses.

Referring to FIG. 1A, optical article 101 include an optical member 102 and one or more attachment device(s) 104 (e.g., one or more attachment members). Optical member 102 may include or correspond to one or more lens, such as a prescription lens, a non-prescription lens, a magnification lens, etc. As shown, optical member 102 corresponds to a single lens, such as a single prescriptive lens corresponding to one eye of a user. In other implementations, optical member 102 may include or correspond to multiple prescriptions, such as a first prescription for a first eye of a user and a second prescription for a second eye of the user.

Optical member 102 includes a first end 106 and a second end 108 which is opposite first end 106. In some implementations, first end 106 may correspond to a right side and second end 108 may correspond to a left side. Additionally, or alternatively, optical member may include a third end 110 (e.g., a top side) and a fourth end 112 (e.g., a bottom side). Optical member 102 also include a first surface 114 and a second surface 116 (as shown in FIG. 1B). First surface 114 may include or correspond to front surface (e.g., a first lens surface) and second surface 116 may include or correspond to a rear surface (e.g., a second lens surface).

In some implementations, optical member 102 is may include a single optical member, such as a single prescriptive lens. Although optical system 100 is shown as having one optical member 102, in other implementations, optical system 100 may include multiple optical members (e.g., 102). In some such implementations, one or more of the optical members (e.g., 102) may have the same prescription or different prescriptions. For example, a first optical member may correspond to a right eye of a user and a second optical member may correspond to a left eye of a user. The first optical member may correspond to a first prescription (or no prescription) and the second optical member may correspond to a second prescription (or no prescription).

The one or more attachment devices 104 are configured to enable optical member 102 (e.g., optical article 101) to be coupled to—e.g., removably coupled to—eyewear apparatus 130. The one or more attachment devices 104 may be coupled, either directly or indirectly, to optical member 102. As shown in FIG. 1A, optical article 101 includes a first attachment device 104 (as indicated by the solid box). An optional, second attachment device 104 (as indicated by the dashed) box) may also be included in optical article 101. In some implementations, optical article 101 may include a first attachment device (e.g., 104) positioned at first end 106 and a second attachment device (e.g., 104) positioned at second end 108. Although described as having one attachment device (and optionally a second attachment device, such description is not intended to be limiting and optical article 101 may have one, two, three, four, or more attachment devices (e.g., 104). As illustrative, non-limiting examples, the one or more attachment device 104 may include or correspond to a magnet, a mounting bracket, an adhesive, a cavity, a protrusion, a portion of Velcro (e.g., hook and/or loop), a friction device, adhesive, a male/female connectors (e.g., projection or recesses), other fastener (e.g., a pin, hook and loop, or the like), the like, or a combination thereof.

Eyewear apparatus 130 may include or correspond to glasses (e.g., spectacles), sunglasses, safety glasses, or goggles. As shown, eyewear apparatus 130 includes a frame 132 (e.g., frame rim), one or more lens 134, a nose pad 136, one or more attachment device(s) 138 (e.g., one or more attachment members), and one or more temples 140. Although eyewear apparatus 130, is described as include each of frame 132, one or more lens 134, nose pad, and one or more temples 140, in other implementations, eyewear apparatus may not include one or more of frame 132, one or more lens 134, nose pad, and one or more temples 140. In a particular implementation, eyewear apparatus 130 includes sunglasses and the one or more lenses 134, such as non-prescription lenses, include tinted lenses and/or polarized lenses, as illustrative, non-limiting examples.

Frame 132 may include multiple rims for receiving, retaining, holding, and/or supporting a lens 134. Although frame 132 is shown as having rims that surround lens 134, this is not to be considered limiting and it is understood that the rims may not surround an entirely of lens 134. In some implementations, nose pad 136 may be defined by a portion of frame that is configured to rest on the nose of a user when the eyewear apparatus 130 is being worn. Although described as including nose pad 136, in other implementations, eyewear apparatus 130 may not include a nose pad.

The one or more attachment devices 138 are configured to couple to (e.g., removably couple to), or cooperate with, the one or more attachment device(s) 104 of optical article 101. For example, a first attachment device attachment device 138 may be configured to selectively, or removably, couple optical article 101 to eyewear apparatus 130. For example, a first attachment device (e.g., 138) of eyewear apparatus 130 may be configured to couple to and form an interface with a first attachment device (e.g., 104) of optical article 101. To illustrate, the first attachment device (e.g., 138) of eyewear apparatus 130 may contact the first attachment device (e.g., 104) of optical article 101 to couple optical article 101 to eyewear apparatus 130. Additionally, or alternatively, a second attachment device (e.g., 138) of eyewear apparatus 130 may be configured to couple to and form an interface with a second attachment device (e.g., 104) of optical article 101. In some implementations, the one or more attachment devices 138 are configured to enable multiple optical articles (e.g., 101) to be coupled to eyewear apparatus 130, such as a first optical article (e.g., 101) positioned with respect to a first lens (e.g., 134) and a second optical article (e.g., 101) positioned with respect to a second lens (e.g., 134). In a particular implementation, eyewear apparatus includes at least one attachment device 138 configured to enable a first optical member may and a second optical member of a single optical article to be removably coupled to eyewear apparatus 130.

Attachment device(s) 138 may be positioned along a portion of frame 132, such as along a rim, a bridge, a nose pad 136, the like, or a combination thereof, as illustrative, non-limiting examples. For example, one attachment device 138 may be positioned on a side of lens 134 and another attachment device 138 may be positioned on an opposing side of the lens. As illustrative, non-limiting examples, the one or more attachment devices 138 may include or correspond to a magnet, a mounting bracket, an adhesive, a cavity, a protrusion, a portion of Velcro (e.g., hook and/or loop), a friction device, adhesive, a male/female connectors (e.g., projection or recesses), other fastener (e.g, a pin, hook and loop, or the like), the like, or a combination thereof. In a particular implementation, the one or more attachment devices 138 include a magnet coupled to frame 132 at a position proximate to a temple 140 and includes a mounting cavity defined in frame 132 and/or nose pad 138. It is noted that when the one or more attachment devices 138 include a magnet, the magnet may be positioned within a cavity of frame 132 such that an interface surface of magnet does not extend or protrude beyond a surface of frame 132. Additionally, or alternatively, the magnet may be embedded in frame 132.

Referring to FIG. 1B, optical article 101 is coupled to eyewear device 130. In some implementations, each attachment device 104 may couple with a respective attachment device 138 at a connection point to secure optical article 101 to frame 132. A connection point may define an interface, such as a magnetic interface, a mechanical interface, or both) between components (e.g., 101 and 130). The one or more attachment devices 104 may be positioned on optical article 101 such that each attachment device 104 (of the one or more attachment devices 104) aligns with a corresponding attachment device 138 of eyewear apparatus 130 to couple optical article 101 with eyewear apparatus 130 in a predetermined orientation. For example, optical article 101 may be configured to couple to eyewear apparatus 130 such that the optical article covers an existing lens (e.g., 134) of eyewear apparatus 130 from a rear of the lens.

During operation, a first optical article (e.g., 101) is coupled to a rear of eyewear device 130 with respect to a first lens (e.g., 134) of frame 132. For example, a first attachment device (e.g., 104) of the first optical article (e.g., 101) may be coupled to a first attachment device (e.g., 138) of frame 132. After the first optical article (e.g., 101) is coupled to the rear of eyewear device 130 with respect to the first lens (e.g., 134) of frame 132, the first optical article (e.g., 101) is decoupled from the rear of eyewear device 130 with respect to the first lens (e.g., 134) of frame 132.

In some implementations, a second optical article (e.g., 101) is coupled to the rear of eyewear device 130 with respect to a second lens (e.g., 134) of frame 132. For example, a second attachment device (e.g., 104) of the second optical article (e.g., 101) may be coupled to a second attachment device (e.g., 138) of frame 132. After the second optical article (e.g., 101) is coupled to the rear of eyewear device 130 with respect to the second lens (e.g., 134) of frame 132, the second optical article (e.g., 101) is decoupled from the rear of eyewear device 130 with respect to the second lens (e.g., 134) of frame 132.

In implementations where eyewear apparatus 130 includes sunglasses and optical article 101 includes a prescription lens, optical article 101 may be selectively coupled and decoupled by a user. In this way, optical article 101, including a prescription lens, may be attached and removed by the user. Accordingly, optical article 101 may be able to selectively transform eyewear apparatus (e.g., sunglasses) into prescription sunglasses. This may allow an individual who switches between prescription spectacles and contacts to wear the same pair of sunglasses by easily removing or attaching optical article 101 from the sunglasses (e.g., 130).

In some implementations, optical article 101 is configured to be used with eyewear apparatus 130. In such implementations, optical article 101 includes an optical member 102, such as a single optical member, having a first surface 114 and a second surface 116. In some implementations, first surface 114 includes or corresponds to a front surface and second surface 116 include or correspond to a rear surface. Optical article 101 may include one or more attachment device(s) 104 configured to couple (e.g., removably couple) optical article 101 to eyewear apparatus 130. For example, optical article 101 may be configured to be coupled to a rear side of frame 132 of eyewear apparatus. In a specific implementation, attachment device (e.g., 104) may include a magnet coupled to optical member 102 and configured to be coupled to a frame (e.g., 132) of an eyewear apparatus (e.g., 130). Additionally, or alternatively, attachment device (e.g., 104) may include a mounting bracket coupled to optical member 102 and configured to be coupled to a nose pad of the frame (e.g., 132) of the eyewear apparatus (e.g., 130).

In another implementations, optical article 101 is configured to be used with eyewear apparatus 130 and includes an optical member 102, such as a single optical member, having opposing first lens surface 114 and a second lens surface 116. Optical article 101 may include a magnet (e.g., 104) coupled to optical member 102 and configured to be coupled to frame 132 of eyewear apparatus 130, a mounting bracket (e.g., 104) coupled to optical member 102 and configured to be coupled to frame 132 of eyewear apparatus 130, or both.

In one or more implementations, optical article 101 may include a support structure coupled to optical member 102, as described further herein at least with reference to FIG. 2A. A size, a shape, or both of the support structure is based on one or more characteristics of frame 132 of eyewear apparatus 130. In some such implementations, optical member 102 is coupled to a magnet (e.g., 104) via the support structure, a mounting bracket (e.g., 104) is coupled to or unitary with the support structure, both the magnet and the mounting bracket. Additionally, or alternatively, optical member 102 includes a channel formed via a side surface of optical member 102. The side surface may be positioned between first surface 114 and second surface 116. In such implementations, at least a portion of the support structure may be positioned within the channel.

In one or more implementations, optical member 102 includes a prescription lens and is configured to be coupled to a user facing side (e.g., a rear side) of the frame 132 using the magnet (e.g., 104a) and the mounting bracket (e.g., 104b). Additionally, or alternatively, optical member 102 may be configured to be coupled to eyewear apparatus 130 such that optical member 102 is positioned between frame 132 and a user of eyewear apparatus 130 when eyewear apparatus is worn by the user.

In some one or more implementations, eyewear apparatus 130 includes a frame 132 having a first side and a second side. The second side may be a user facing side. In some such implementations, frame 132 includes a nose pad 136 comprising a cavity configured to receive the mounting bracket arm (e.g., 104) of optical article 101, a magnet coupled to the second side and configured to be coupled with a magnet (e.g., 104) of optical article 101, or a combination thereof. In a particular implementation, to couple optical member 102 to frame 132, the magnet (e.g., 104) is configured to be positioned in a first cavity of the frame 132, at least a portion of the mounting bracket (e.g., 104) is configured to be positioned within a second cavity of frame 132, or both. Some implementations include one or more lenses 134 coupled to the optical frame 132 where each of the one or more lenses (e.g., 134) is distinct from the optical member 102. The eyewear apparatus 130 may be an apparatus select from the group consisting of glasses, spectacles, sunglasses, safety glasses, or goggles.

In one or more implementations, optical member 102 includes a first portion and a second portion, as described at least with reference to FIGS. 3A-3C. For example, the first portion may include a lens having first surface 114 and second surface 116. The second portion may extend from a side surface of the first portion. In some such implementations, the side surface is positioned between first surface 114 (e.g., a first lens surface) and second surface 116 (e.g., a second lens surface). The second portion may be coupled to, in contact with, or include one or more attachment devices 104. For example, the second portion may be may be coupled to, in contact with, or include a magnet, a mounting bracket, or both.

System 100 therefore provides eyewear apparatus 130 and one or more optical articles 101 (e.g., one or more prescription add-ons) which may selectively couple/decouple with the eyewear apparatus 130. Accordingly, system 100 may advantageously provide versatility to eyewear apparatus 130 such that a user does not need to own both prescription and non-prescription versions of an eyewear apparatus, which may beneficially reduce a cost to the user. Accordingly, optical article 101 may enable management of different prescriptions such that an optical article can be replaced as a prescription for a corresponding eye changes. It is also noted that implementations in which optical article 101 includes a single optical member (e.g., a single prescriptive lens), optical article 101 (or two optical articles) may have a reduced weight as compared to an optical article that includes two optical members (e.g, two prescriptive lenses).

Figure 2B:
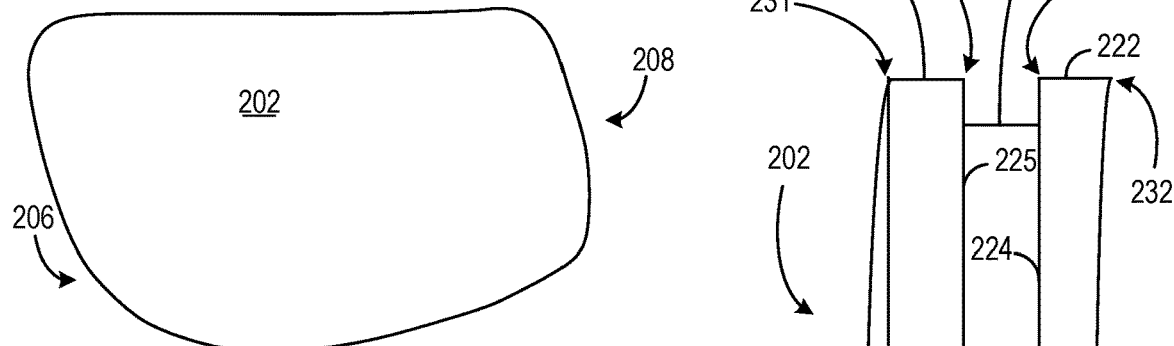
FIG. 2B is a front view of an example of an optical member of the optical article of FIG. 2A.
Figure 2D:
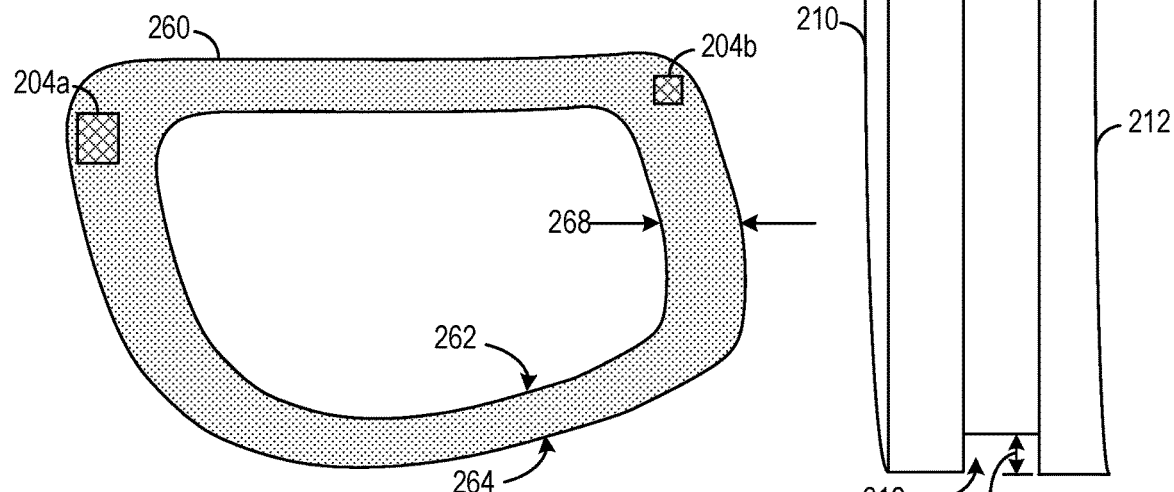
FIG. 2D is a front view of an example of a support structure of the optical article of FIG. 2A.
Figure 2C:
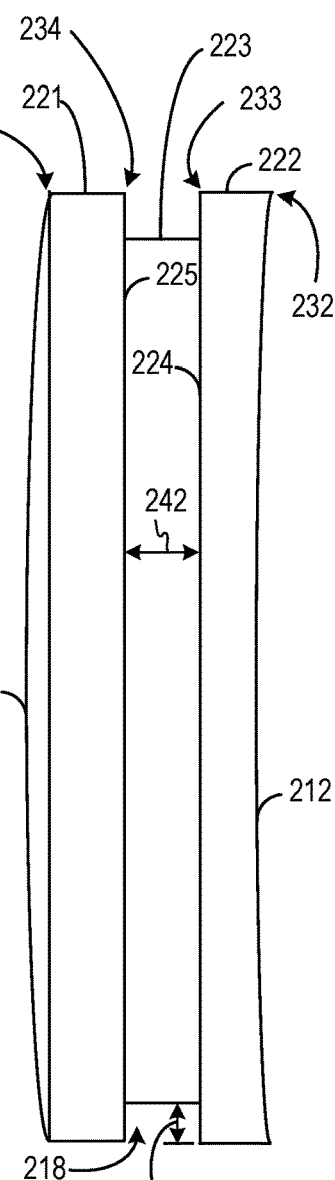
FIG. 2C is a side view of an example of the optical member of FIG. 2B.

Referring to FIG. 2A-2D, views of one or more components of an example of an optical article are shown. For example, FIG. 2A shows an example of optical article 200, FIG. 2B shows an optical member 202 of optical article 200, FIG. 2C shows a side view of the optical member 202, and FIG. 2D shows an example of support structure 260. Optical article 200 may include or correspond to optical article 101.

As shown in FIG. 2A, optical article 200 includes optical member 202, one or more attachment device(s) 204 (e.g., 204*a*, 204*b*), and support structure 260 (e.g., a frame or ring). Optical member 202 and attachment devices 204 may include or correspond to optical member 102 and one or more attachment devices 104, respectively.

Optical member 202 may be coupled to support structure 260. For example, support structure 260 may surround (e.g., encircle) at least a portion of optical member 202 while the ring is coupled to the optical member. As shown, an exposed portion of support structure 260 has a distance 207 (e.g., a width) that extends outward from a perimeter of optical member 202. In some implementations, one or more attachment device(s) 204 are coupled to, or defined by, support structure 260, such as one or more attachment device(s) 204 coupled to the exposed portion 261 of support structure 260. The one or more attachment devices 204 may be couple to, or unitary with, support structure 260. As shown, the one or more attachment devices 204 include a first attachment device 204*a* and a second attachment device 204*b*. Although optical article 200 (e.g., support structure 260) is shown as having two attachment devices 204 (e.g., 204*a*, 204*b*), in other implementations, optical article 200 (e.g., support structure 260) may include fewer than two attachment devices or more than two attachment devices.

Referring to FIGS. 2B and 2C, optical member 202 is shown. To illustrate, FIG. 2B shows optical member 202 of optical article 200 without support structure 260. Optical member 202 can have any suitable shape, such as that optical member 202 can be spherical, toric, aspherical, the like, or a combination thereof, as illustrative, non-limiting examples. In some implementations, optical member 202 includes a lens (e.g., a prescription lens). As shown, first end 206 is opposite second end 208. First end 206 and second end 208 may include or correspond to first end 106 and second end 108, respectively.

Referring to FIG. 2C, a side view of optical member 202 is shown. Optical member 202 includes a first surface 210 (e.g., a front surface) and a second surface 212 (e.g., a rear surface). First and second surfaces are opposing lens surfaces of optical member 202. In some implementations, each of first surface 210 and second surface 212 can be concave, convex, or planar. Optical member also includes one or more side surfaces, such as a first side surface 221, a second side surface 222. First side surface 221 may extend from first surface 210 and may intersect with first surface 210 at a first edge 231. Second side surface 222 may extend from second surface 212 and may intersect with second surface 212 at a second edge 232.

Optical member 202 may include a channel 218 configured to receive at least a portion of support structure 260. Channel 218 (e.g., groove) may be defined by a third side surface 223 (e.g., a bottom channel wall), a third surface 224 (e.g., a first channel side wall), and a fourth surface 225 (e.g., a second channel wall). Third surface 224 may extend from second side surface 222 and may intersect with second side surface 222 at a third edge 233. Third side surface 223 may extend between third surface 224 and fourth surface 225. Third side surface 223 may intersect with third surface 224 to form a first corner and may intersect with fourth surface 225 to form a second corner. Fourth surface 225 may extend from first side surface 221 may and may intersect with first side surface 221 at a fourth edge 234. In some implementations, optical member 202 may not include first side surface 221 such that first surface 210 and fourth surface 225 intersect to form an edge. Although channel 218 is shown and described as having corners (e.g., a rectangular shape), in other implementations, channel may have a different shape, such as U-shaped, V-shaped, elliptical, curved, smooth, undulating, other shape, or a combination thereof, as illustrative, non-limiting examples.

Channel 218 may extend along a portion (e.g., at least a portion) or an entirety of the perimeter of optical member 202. Channel may be positioned between first surface 210 and second surface 212. In some implementations, a distance between first surface 210 and fourth surface 225 is the same a distance between second surface 212 and third surface 224. In implementations, a distance between first surface 210 and fourth surface 225 is different from (e.g., greater than or less than) a distance between second surface 212 and third surface 224. A position of the groove to the first lens surface 210 may depend on a prescription (RX) of the optical member and/or a configuration of frame of an eyewear apparatus (e.g., 130). For example, channel 218 may be positioned such that a gap (e.g., a separation) between the optical member 202 (e.g., an RX lens) and a lens (e.g., 134) of the eyewear apparatus is minimized.

As shown in FIG. 2C, channel 218 may have a depth 240 as measured from first side surface 221 or second side surface 222. Is some implementations, depth 240 of channel 218 is a maximum depth between third side surface 223 with respect to first side surface 221 and third side surface 223 with respect to either second side surface 222. Depth 240 may be greater than or equal to 0.1 mm, such as for example, greater than or equal to or between any two of, 0.1 mm, 0.2 mm, 0.3 mm, 0.4 mm, 0.5 mm, 0.6 mm, 0.7 mm, 0.8 mm, or larger. In some implementations, depth 240 of channel 218 may vary. To illustrate, depth 240 may vary according to an interface pattern between optical member 202 and support structure 260.

Channel 218 may define a width 242 measured between third surface 224 and fourth surface 225. The width may be greater than or equal to 0.2 mm, such as for example, greater than or equal to or between any two of, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, or larger. In some implementations, width 242 of channel 218 may vary. To illustrate, width 242 may vary according to an interface pattern between optical member 202 and support structure 260.

Referring to FIG. 2D, an example of a support structure 260 of optical article 200 is shown. Support structure 260 may include an inner surface 262 and an outer surface 264. A distance 268 between inner surface 262 and outer surface 264 may be greater than or equal to distance 207. Inner surface 262 may have an outline that is configured to interface with (e.g., match) a surface of optical member, such as third side surface 223, third surface 224, fourth surface 225, or a combination thereof. When support structure 260 is coupled to optical member 202, at least a portion of support structure 260 may be positioned within channel 218. For example, support structure 260 may include an annular body having inner surface 262 configured to engage channel 218 and outer surface 264 configured to extend away from optical member 202 when a portion of support structure is positioned within channel 218. In some implementations, support structure 260 may include an elastic material, a metal, a polymer (e.g., a plastic), or a combination thereof, as illustrative, non-limiting examples.

A size, a shape, or both of support structure 206 is based on one or more characteristics of an eyewear apparatus (e.g., 130). In some implementations, outer surface 264 may facilitate engagement of optical article 200 with frame 230. To illustrate, outer surface 264 may be customized to engage a frame of a particular style and/or brand of eyewear apparatus. For example, the outer surface 264 of support structure 206 may be defined by the geometry of frame 232. As another example, outer surface 264 may be shaped and sized to be supported by a frame and inner surface 262 may be shaped and sized to be at least one 1 mm inside an aperture, such as a lens aperture, of the frame.

In some implementations, support structure 206 may manufactured separately from optical member 202. To illustrate, inner surface 262 of support structure 206 may be manufactured to snap or click into channel 218 such that the ring and optical member 202 may be coupled together via friction. In other implementations, support structure 206 and optical member 202 may be unitary (e.g., manufactured together). For example, support structure 206 may be formed with optical member 202 via an injection process (e.g., injection molding). Alternatively, support structure 260 may be removably couple to optical member 202 such that different support structures (e.g., 260) may be coupled to optical member to enable optical member 202 to be coupled to different eyewear apparatuses.

In some implementations, support structure 260 may be transparent to allow for optimal visibility, while in other implementations, support structure may be colored to provide customization and aesthetic appeal. For example, support structure 260 may be the same color as frame (e.g., 132), or a different color (e.g., accent color) to act as a style element.

One or more attachment device 204 may be configured to structurally couple optical member 202 to an eyewear apparatus. As shown, first and second attachment devices 204a, 204b are coupled to support structure 260. As illustrative, non-limiting examples, first attachment device 204a may include a magnet and second attachment device 204b may include a protrusion, such as a mounting bracket. Additionally, or alternatively, at least one attachment device 204 may be configured to couple optical member 202 to an eyewear apparatus in a non-structural manner (e.g., chemically, magnetically, electromagnetically, or the like).

In some implementations, optical article 200 is configured to be used with eyewear apparatus 130. In such implementations, optical article 200 includes an optical member 202, such as a single optical member, having a first surface 210 and a second surface 212. In some implementations, first surface 210 includes or corresponds to a front surface and second surface 212 include or correspond to a rear surface. Optical article 202 may include one or more attachment device(s) 204 configured to couple (e.g., removably couple) optical article 200 to eyewear apparatus. For example, optical article 200 may be configured to be coupled to a rear side of frame of eyewear apparatus. In some implementations, optical article 200 further includes support structure 260. In a specific implementation, optical member 202 is coupled to at least one attachment device 204 via support structure 260. Additionally, or alternatively, at least a portion of support structure 260 may be positioned in a channel of optical member 202.

In another implementations, optical article 200 is configured for use with an eyewear apparatus 230 and includes optical member 202 having opposing first and second lens surfaces 210, 212, a magnet (e.g., 204a) coupled to optical member 202 and configured to be coupled to a frame of an eyewear apparatus, and a mounting bracket (e.g., 204b) coupled to the optical member 202 and configured to be coupled to the frame of the eyewear apparatus. In some implementations, optical article 200 may include a single optical member (e.g., 202).

In one or more implementations, optical member 202 includes channel 218 formed via one or more side surfaces of optical member 202. The one or more side surfaces are positioned between first surface 210 and second surface 212. In some implementations, optical member 202 includes a prescription lens and is configured to be coupled to a user facing side of an eyewear apparatus (e.g., 130).

In one or more implementations, optical article 200 further includes support structure 260 coupled to optical member 202. A size, a shape, or both of the support structure (e.g., 260) is based on one or more characteristics of a frame of the eyewear apparatus. In some implementations, at least a portion of the support structure 260 is positioned within channel 218 of optical member 202. Additionally, or alternatively, optical member 202 may be coupled to one or more attachment devices 204 via support structure 260. To illustrate, optical member 202 may be coupled to a magnet, a mounting bracket, or both, via support structure 260. For example, the magnet, the mounting bracket, or both, may be in contact with or unitary with support structure 260. The magnet may be configured to be positioned in a first cavity of the frame. At least a portion of the mounting bracket is configured to be positioned within a second cavity of the frame.

The optical member 202 and support structure 260 of FIGS. 2A-2D may be utilized such that support structure 260 couples optical member 202 to an eyewear apparatus allows optical member 202 to be used with a large range of prescriptions. For example, for prescriptions that are highly negative, the radii of the lens (e.g., optical member 202) is small and the distance between the lens and the eye is small. As a result, the eyelashes may potentially touch the prescription lens. Using support structure 260 allows highly negative prescription lenses (e.g., optical member 202) to be used by increasing the width between the inner and the outer surface (e.g., 262, 264) of support structure 260. Similarly, support structure 260 may be designed to coupled highly positive prescription lenses to eyewear apparatus 230 without optical member 202 interfering with lenses (e.g., 134) of an eyewear apparatus or a wearer's eyelashes. In other words, support structure 260 (or an exposed portion of support structure 260 when coupled to optical member 202) may be customizable based on the prescription of the optical member 202 and a frame (e.g., 132) of the eyewear apparatus. Additionally, support structure 260 allows for easy replacement of cracked or damaged lenses (e.g., 202). A user may attach or remove support structure 260 to easily exchange optical member 202 without the need to for professional service, such as by an optician, ophthalmologist, optometrists, or the like.

Referring to FIG. 3A-3C, views of one or more components of an example of an optical article are shown. For example, FIG. 3A shows an example of optical article 300, FIG. 2B shows a side view to illustrate one or more aspects of the optical member 202, and FIG. 2C shows a portion of optical article 300. Optical article 300 may include or correspond to optical article 101 and/or optical article 200.

Referring to FIG. 3A, optical article 300 may include an optical member 302 and one or more attachment device(s) 304 (e.g., a first attachment device 304a and a second attachment device 304b). Optical member 320 may include or correspond to optical member 102, 202. The one or more attachment device(s) 304 may include or correspond to attachment device(s) 104 and/or attachment devices 204 (e.g., first attachment device 204a, second attachment device 204b).

Optical article 300 may include a single optical lens (e.g., a prescription lens for an eye). Optical member 302 may include a first end 306 and a second end 308. In some implementations, in some implementations, optical article 300 includes a first portion 316 that includes or corresponds to optical member 302 and a second portion that includes or corresponds to an extension portion. The one or more attachment devices 304 may be coupled to the extension portion. For example, the one or more attachment device 304 may be in contact or unitary with the second portion. As shown in FIG. 3A, at least one attachment device 304 is positioned at each of first end 306 and second end 308, such as a first attachment device 304a positioned at first end 306 and a second attachment device 304b positioned at second end 308. However, it is noted that the one or more attachment devices 304 may be located at different positions on optical article 300. Although optical article 300 is described as having two attachment devices 304, in other implementations, optical article may include fewer than or more than two attachment devices 304.

Referring to FIGS. 3B and 3C, a side view and a portion 314 of the side view of optical article 300 are shown. It is noted that one or more aspects of optical article 300 are not shown in FIGS. 3B and 3C, such as one or more attachment devices 304.

Optical article 300 includes a first surface 310 (e.g., a front surface) and a second surface 312 (e.g., a rear surface). Each of first surface 310 and second surface 312 can be concave, convex, or planar. Optical article 300 also includes one or more side surfaces, such as a first side surface 321 and a second side surface 322. First side surface 321 may extend from first surface 310 and may intersect with first surface 310 at a first edge 331. Second side surface 322 may extend from second surface 312 and may intersect with second surface 312 at a second edge 332. Optical article 300 may also include a third surface 323. Third surface 323 may extend from second surface 322 and may intersect with second surface 322 to form a third edge 333. Additionally, or alternatively, third surface 323 may extend from first surface 321 and may intersect with first surface 321 at a corner. First side surface 321 and third surface 323 may form a ledge (e.g., a step or shelf) of optical article 300.

Optical member 202 may include a channel 218 configured to receive at least a portion of support structure 260. Channel 218 (e.g., groove) may be defined by a third side surface 223 (e.g., a bottom channel wall), a third surface 224 (e.g., a first channel side wall), and a fourth surface 225 (e.g. a second channel wall). Third surface 224 may extend from second side surface 222 and may intersect with second side surface 222 at a third edge 233. Third side surface 223 may extend between third surface 224 and fourth surface 225. Third side surface 223 may intersect with third surface 224 to form a first corner and may intersect with fourth surface 225 to form a second corner. Fourth surface 225 may extend from first side surface 221 may and may intersect with first side surface 221 at a fourth edge 234. In some implementations, optical member 202 may not include first side surface 221 such that first surface 210 and fourth surface 225 intersect to form an edge.

As shown, the maximum transverse dimension second side surface 322 is greater than the maximum transverse dimension of first side surface 31. First and second side surfaces 321, 322 are connected via third surface 323. Third surface 323 may extend along a plane that is substantially orthogonal to first and second side walls 321, 322. In some implementations, third surface 323 is parallel to at least a portion of each of first surface 310 and second surface 312. First side surface 321 and third surface 326 may cooperate to define the ledge along the perimeter of optical member 302 such that the ledge may cooperate with a frame of an eyewear apparatus to orient the optical member 300 (e.g., the optical article 300) within the frame. A size and/or shape of the ledge may be based on one or more dimensions of the frame and may be formed in the optical article 300 using a milling machine, such as a three axis milling machine, as an illustrative, non-limiting example. In some implementations, the frame is scanned or traced with an optician tracing equipment and the ledge manufactured based on the completed scan/trace. For example, a homothety may be done to accurately orient optical member 202 within the frame (e.g., 132).

In some implementations, third surface 233 may define a width 327 measured between first surface 321 and second surface 322 in a direction perpendicular to second side surface 332, that is greater than or equal to 0.1 mm, such as for example, greater than or equal to or between any two of, 0.2 mm, 0.3 mm, 0.4 mm, 0.5 mm, 0.6 mm, 0.7 mm, 0.8 mm, 0.9 mm, 1.0 mm, 1.1 mm, 1.2 mm, or larger. In some implementations, in order to have a correct support on the frame, width 327 of the optical member 302 is at the minimum 1 mm. Additionally, or alternatively, first surface 321 may have a thickness 242 measured from first surface 310 to third surface 323 that is greater than or equal to 0.05 mm, such as for example, greater than or equal to or between any two of, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, or larger. In some implementations, the thickness 242 is greater than or equal to the width 327. Additionally, or alternatively, the thickness 424 (e.g., a depth of the ledge) may be selected position 310 proximate to a surface of a lens of a frame (of an eyewear device) without contacting the surface of the lens. For example, a distance between first surface 310 and the surface of the lens of the frame may be less than or equal to 1 mm, such as for example, less than or equal to 0.5 mm or 0.25 mm.

It is noted that one or more attachment devices 304 may be coupled to or in contact with second surface 322 and/or third surface 323. For example, a mounting bracket may be coupled to second surface 322. As another example, a magnet may be coupled to third surface 323.

In some implementations, optical article 300 may be configured for use with an eyewear apparatus. In some implementations, optical article 300 includes optical member 302, such as a single optical member, having opposing first lens surface (e.g., 310) and second lens surfaces (e.g., 312). In some implementations, optical article 300 includes a magnet (e.g., 304a) coupled to optical member 302 and configured to be coupled to a frame (e.g., 132) of an eyewear apparatus (e.g., 130). In some implementations, optical article 300 includes a mounting bracket (e.g., 304a) coupled to optical member 302 and configured to be coupled to the frame of the eyewear apparatus.

In some implementations, optical article 300 includes: a first portion 312 comprising a lens including the first and second lens surfaces (e.g., 310, 312), and a second portion extending from a side surface (e.g., 321) of the first portion 316. The side surface may be positioned between the first and second lens surfaces (e.g., 310, 312). The second portion may be coupled to or include on or more attachment devices 304, such as a mounting bracket (e.g., 304a), a magnet (e.g., 304b), or a combination thereof, as illustrative, non-limiting examples. To illustrate, the mounting bracket (e.g., 304a) may be coupled to optical member 302 and configured to be coupled to a frame of an eyewear apparatus. Additionally, or alternatively, the magnet (e.g., 304b) may be coupled to optical member 302 and configured to be coupled to the frame of the eyewear apparatus.

In one or more implementations, the optical member 302 includes a prescription lens. Optical member 302 may be configured to be coupled to a user facing side of a frame (e.g., 132), such as via one or more attachment devices 304

The optical article 300 of FIGS. 3A-3C may be utilized to allows optical member 302 to be used with one or more eyewear apparatuses. The optical article 300 having a ledge formed by at least one side surface of optical member 302 may enable a small gap to be present between first surface 310 of optical member 302 and a lens (e.g., 134) of the eyewear apparatus. Such positioning may make use of optical article 300 less noticeable as compared to an eyewear apparatus without the optical article 300. Additionally, or alternatively, as compared to optical article 200, optical article 300 include a unitary design having a reduce number of components, which may be faster to manufacture, have a reduced cost, and may have tighter tolerance control providing a secure fit between the optical article 300 and a frame.

Figure 4A:
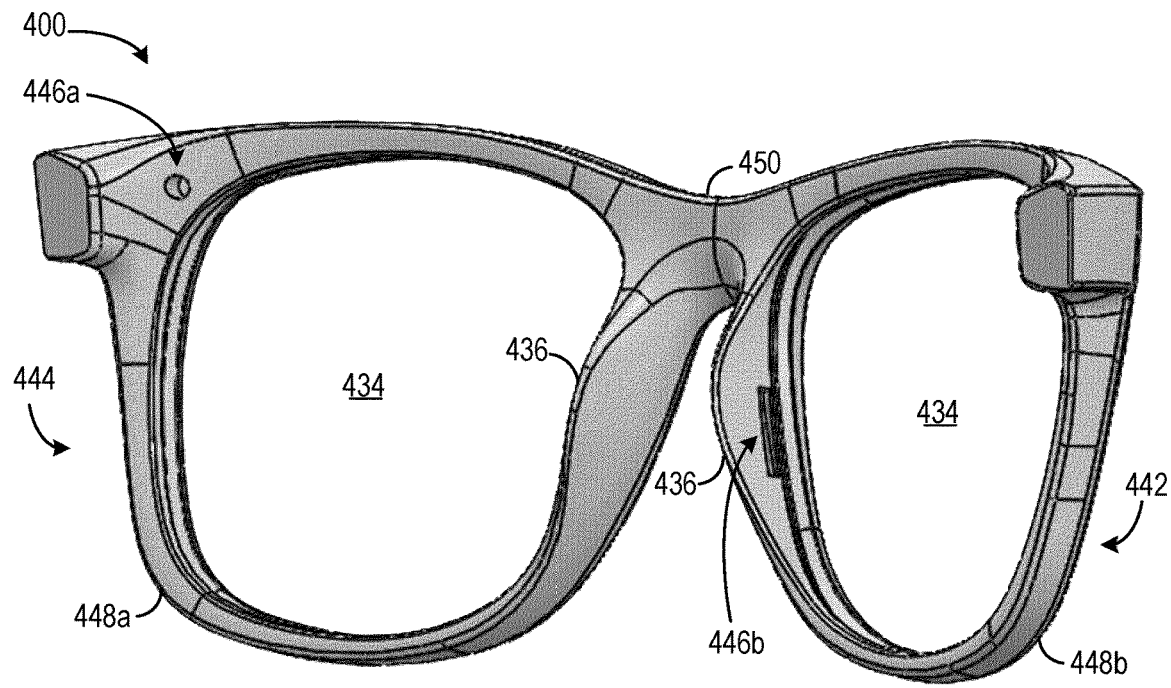
FIG. 4A is a rear perspective view of an example of an eyewear apparatus.
Figure 4B:
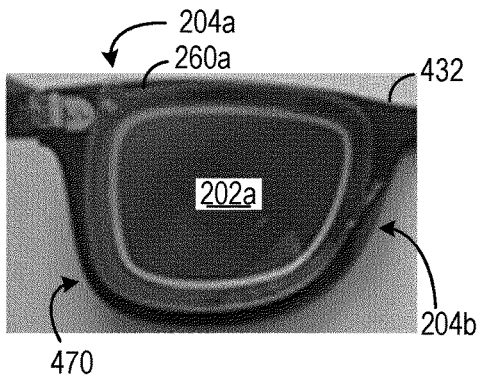
FIG. 4B is a rear view of an example of a first optical article coupled to the eyewear apparatus of FIG. 4A.
Figure 4C:
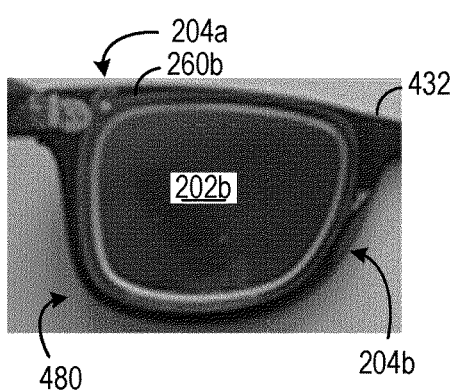
FIG. 4C is a rear view of an example of a second optical article coupled to the eyewear apparatus of FIG. 4A.
Figure 4D:
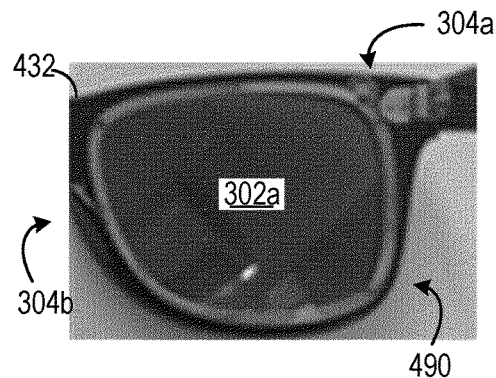
FIG. 4D is a rear view of an example of a third optical article coupled to the eyewear apparatus of FIG. 4A.

Referring now to FIGS. 4A-4D, views of one or more examples of an eyewear apparatus 400 are shown. FIG. 4A shows a rear perspective view of eyewear apparatus 400. FIGS. 4B-4D, show rear views of examples of eyewear apparatus coupled to different optical articles.

Referring to FIG. 4A, eyewear apparatus 400 may include or correspond to eyewear apparatus 130. Eyewear apparatus 400 may include or correspond to glasses, eyeglasses, spectacles, sunglasses, safety glasses, goggles (e.g., safety, ski, water, etc.), or the like, as illustrative, non-limiting examples.

As shown, eyewear apparatus 400 includes a frame 432, one or more lenses 434, a nod pad 436, and one or more attachment device(s) 438. Frame 432, lenses 434, nose pad 436, and the one or more attachment devices 446 may include or correspond to frame 132, lenses 134, nose pad 136, and the one or more attachment device 136, respectively. As shown, the lenses 434 and attachment device(s) 446 are coupled to or defined by frame 432. In some implementations, the one or more attachment device 446 may be unitary with or integrated into frame 432.

Frame 432 is configured to receive, retain, hold, and/or support one or more lenses 434 such that the lenses may be aligned or lined up abreast with respect to each other so as to be placed in front of respective eyes of a wearer when the eyewear apparatus is being worn. Frame 432 may include a first side 442, a second side 444, one or more cavities 446, one or more rim(s) 448, a bridge 450, and a nose pad 436. As shown, first side 442 is opposite of second side 444. In an implementation where eyewear apparatus 430 is worn by a user, second side 444 is a user facing side (e.g., is closer to an eye of a user).

Frame 432 may include one or more rims (or rim frame) 448 configured to receive, retain, hold, and/or support each of the one or more lenses 434. As shown, frame 432 may include two rims 448a, 448b in a side-by-side arrangement. Each of the two rims 448a, 448b may be a full rim. For example, each rim 448a, 448b, may include an annular body that defines an enclosed aperture where a component (e.g., lens 434) may be placed. In some implementations, a rim 448 may be configured to receive an optical article, such as optical article 101, optical article 200, or optical article 300. According to various implementations, rim 448 may also be a half rim, or frame 432 may be without any rims. Accordingly, the frame 432 may be a full rimmed frame or a semi-rimless frame or a rimless frame.

Frame 432 may also include a bridge 450. The bridge 450 may be a part of the frame 432 which extends between the two rims 448a and 448b. In some implementations, bridge 450 may be connected to the lenses 434. Accordingly, the bridge 450 may be positioned between the first and second lenses 434. Further, bridge 450 may be above the nose of the wearer when the eyewear apparatus 430 is being worn.

Frame 432 may also include a nose pad 436. In some implementations, nose pad 436 may be defined by a portion of second side 444, while in other implementations, nose pad 436 may include a member that is coupled to second side 444 of frame 432 and extends away from the second side. Nose pad 436 may be defined by, or coupled to a rim 448. As shown, fame 432 may include two nose pads 436 defined by a portion of each rim 448. In some implementations, nose pad 436 may defined by a user facing side (e.g., second side 444) of rim 448 directly below bridge 450. Although described as having nose pad 436, in other implementations, frame 432 may not include nose pad 436.

In some implementations, frame 432 may include one or more attachment devices 446 (e.g., one or more attachment features). For example, the one or more attachment features 446 may include or correspond to the one or more attachment devices 138. To illustrate, the one or more attachment devices 446 may include one or more cavities (e.g., depressions) defined on second side 444 of frame 342. Each of the one or more attachment features 446 may be configured to be coupled to an attachment device of an optical article (e.g., 101, 200, 300) to couple frame 432 and the optical article. As shown, frame includes a first attachment device 446a (e.g., a magnet) and a second attachment device 446b (e.g., a cavity). It is noted that the one or more attachment devices 446 may additionally, or alternatively, be positioned on rim 448 and/or bridge 450. Attachment device(s) 446 may be positioned at any suitable location of frame 432. In this way, at least one optical article may be coupled frame 432 such that the optical article covers a respective lens (e.g., 434). It is also noted, that the one or more attachment devices 446 may not impact user or comfort of frames when worn by a user without being coupled to one or more optical articles.

In some implementations, first attachment device 446a may include a magnet, a cavity, a protrusion, or a combination thereof. For example, the magnet may be positioned within the cavity and an opening of the cavity may have the protrusion. The first attachment device 446a may be configured to receive a counterpart attachment device of an optical article configured to interface with the first attachment device 446a. In some implementations, second attachment device 446b may include a cavity configured to receive a protrusion (e.g., a mounting bracket) of an optical article.

Referring now to FIGS. 4B-4D, examples of optical articles 400 are shown coupled to a frame 432 of eyewear apparatus 430 (e.g., sunglasses). For example, FIG. 4B shows an optical article 470 is coupled to frame 432, FIG. 4C shows an optical article 480 is coupled to frame 432, and FIG. 4D shows an optical article 490 is coupled to frame 432.

Referring to FIGS. 4B and 4C, optical articles 470 and 480 of FIGS. 4B and 4C may include or correspond to optical article 200. For example, optical article 470 may include one or more attachment means 204 (e.g., 204a, 204b), an optical member 202 (e.g., 202a), and a support structure 260 (e.g., 260a). Optical article 480 may include one or more attachment means 204 (e.g., 204a, 204b), an optical member 202 (e.g., 202b), and a support structure 260 (e.g., 260b). Each of optical articles 470, 480 may be coupled to a frame 432 at a positon that correspond to a left eye of a user. As compared to an exposed portion of support structure 260b of FIG. 4C, an exposed portion of support structure 260a of FIG. 4B is larger. Similarly, as compared to optical member 202b of FIG. 4C, optical member 202a of FIG. 4B is smaller. Accordingly, FIGS. 4B and 4C show that different support structures (e.g., 260) can be used to enable different size optical members (e.g., 202) to be used with the same eyewear apparatus 400. A size and shape of each support structure (e.g., 260) may be selected for a particular optical member (e.g., 202) and for a particular frame (e.g., 432). Additionally, or alternatively, the size of each support structure (e.g., 260) may be a function of the prescription lens, such as the optical member, and/or a positioning of the optical member with respect to the corresponding eye of the user.

Referring to FIG. 4D, optical article 490 may include or correspond to optical article 300. For example, optical article 490 may include optical member 302 (e.g., 302a) and one or more attachment device 304 (e.g., 304a, 304b). Optical article 490 may be coupled to a frame 432 at a positon that correspond to a right eye of a user.

In some implementations, an eyewear apparatus 430 is configured to couple to an optical article (e.g., 101, 200, 300, 470, 480, 490) optical member 402. In some implementations, eyewear apparatus 430 includes frame 432 having a first side 442 and a second side 444, the second side being a user facing side. Frame 432 includes one or more attachment devices 446. For example, the one or more attachment devices may include a cavity configured to receive the mounting bracket arm of the optical article, a magnet coupled to the second side and configured to be coupled with a magnet of the optical article, or both. Additionally, or alternatively, eyewear apparatus 430 may include one or more lenses 434 coupled to the optical frame 432, each of the one or more lenses distinct from the optical article 402. The eyewear apparatus 430 may include an apparatus select from the group consisting of glasses, spectacles, sunglasses, safety glasses, or goggles.

Accordingly, FIGS. 4A-4D provide illustrative examples of eyewear apparatus 400 used with one or more optical articles (e.g., 101, 200, 300, 470, 480, 490). To illustrate, eyewear apparatus 400 may be coupled to a single optical article or to multiple articles, such as a first optical article (e.g., 101, 200, 300, 470, 480, 490) corresponding to a left eye and a second optical article (e.g., 101, 200, 300, 470, 480, 490) corresponding to a right eye. Accordingly, a user may be able to use one or more optical article (e.g., prescription add-ons) with one or more eyewear apparatuses and a particular eyewear apparatus may be used with a variety of optical articles. Thus, an optical system (e.g., 100) that includes such optical articles (e.g., 101, 200, 300, 470, 480, 490) and eyewear apparatuses (e.g., 130, 400) may provide versatility of multiple users while still enabling customization for each user's prescriptive lens needs.

Figure 5:
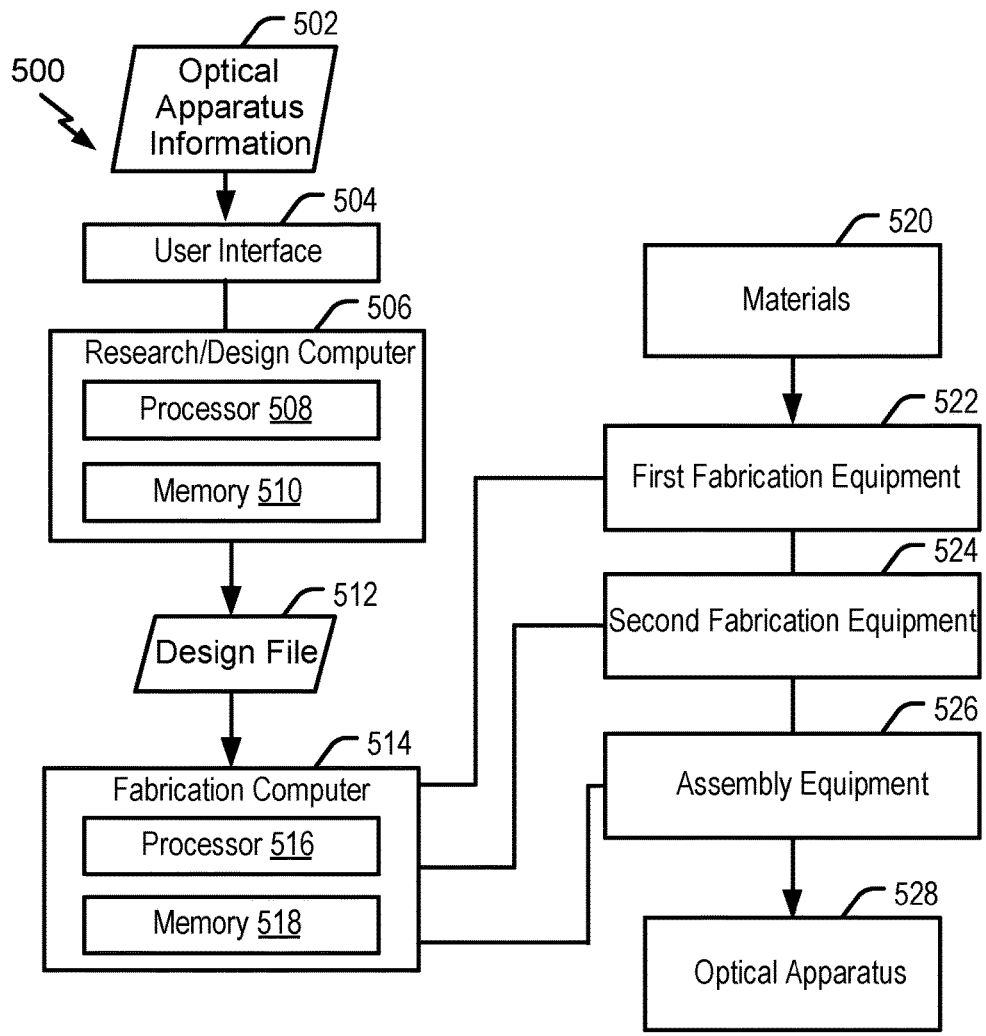
FIG. 5 is a block diagram of an example of a system for fabricating one or more components of an optical system.

The foregoing disclosed optical systems, optical articles, and/or eyewear apparatuses may be designed and configured into computer files stored on a computer readable media. Some or all of such files may be provided to fabrication handlers who fabricate the electric optical systems, optical articles, and/or eyewear apparatuses based on such files. FIG. 5 depicts an example of a system 500 for fabricating optical systems, optical articles, and/or eyewear apparatuses.

Optical apparatus information 502 (e.g., optical system information, optical article information, and/or eyewear apparatus information) is received at a research/design computer 506. Optical apparatus information 502 may include design information representing at least one physical property of an optical apparatus (e.g., an optical system, an optical article, and/or an eyewear apparatus), such optical system 100, optical article 101, 200, 300, 470, 480, 490, or eyewear apparatus 130, 400. For example, optical apparatus information 502 may include measurements of one or more of optical article 101, 200, 300, 470, 480, 490 (e.g., optical members, attachment devices, support structures, extension portions, ledges, etc.) or eyewear apparatus 130, 400 (e.g. frame, attachment devices, nose pads, temples, bridges, etc.), that are entered via a user interface 504 coupled to research/design computer 506. Research/design computer 506 includes a processor 508, such as one or more processing cores, coupled to a computer readable medium (e.g., a computer readable storage device), such as a memory 510. Memory 510 may store computer readable instructions that are executable to cause processor 508 to transform optical apparatus information 502 into a design file 512. Design file 512 may include information indicating a design for an optical apparatus (e.g., one or more optical device or components), such as measurements of one or more of optical article 101, 200, 300, 470, 480, 490 (e.g., optical members, attachment devices, support structures, extension portions, ledges, etc.) or eyewear apparatus 130, 400 (e.g. frame, attachment devices, nose pads, temples, bridges, etc.). Design file 512 may be in a format that is usable by other systems to perform fabrication, as further described herein.

Design file 512 is provided to a fabrication computer 514 to control fabrication equipment during a fabrication process for material 520. Fabrication computer 514 includes a processor 516 (e.g., one or more processors), such as one or more processing cores, and a memory 518. Memory 518 may include executable instructions such as computer-readable instructions or processor-readable instructions that are executable by a computer, such as processor 516. The executable instructions may enable processor 516 to control fabrication equipment, such as by sending one or more control signals or data, during a fabrication process for materials 520. In some implementations, the fabrication system (e.g., an automated system that performs the fabrication process) may have a distributed architecture. For example, a high-level system (e.g., processor 516) may issue instructions to be executed by controllers of one or more lower-level systems (e.g., individual pieces of fabrication equipment). The lower-level systems may receive the instructions, may issue sub-commands to subordinate modules or process tools, and may communicate status back to the high-level system. Thus, multiple processors (e.g., processor 516 and one or more controllers) may be distributed in the fabrication system.

The fabrication equipment includes first fabrication equipment 522, second fabrication equipment 524, and assembly equipment 526. First fabrication equipment 522 is configured to form an optical member, such as optical member (e.g., 102, 202, 202a, 202b, 302, 302a) from materials 520, such as a wafer. The optical member may be formed by drilling, cutting, etching, milling, molding, injecting, etc. Second fabrication equipment 524 is configured to form an eyewear apparatus (e.g., 130, 400) from materials 520. The eyewear apparatus may be formed by drilling, cutting, etching, milling, molding, injecting, etc.

Assembly equipment 526 is configured to assemble the fabricated pieces into one or more devices. For example, optical member may be assembled with one or more attachment device to form an optical article. As another example, an optical article including the optical member may be couple to the eyewear apparatus.

Performing the fabrication operations on materials 520 operates to form one or more optical devices 528 (e.g., one or more optical devices—an optical article, an eyewear apparatus, or both). For example, the one or more optical devices 528 may include or correspond to optical article 101, 200, 300, 470, 480, 490 (e.g., optical members, attachment devices, support structures, extension portions, ledges, etc.) or eyewear apparatus 130, 400.

System 500 enables fabrication of one or more optical devices, as described here. For example, the one or more optical devices may include an eyewear apparatus and/or one or more optical articles (e.g., one or more prescription add-ons) which may selectively couple/decouple with the eyewear apparatus. Accordingly, system 500 may advantageously form the one or more optical devices to provide versatility to the eyewear apparatus such that a user does not need to own both prescription and non-prescription versions of an eyewear apparatus, which may beneficially reduce a cost to the user.

Figure 6:
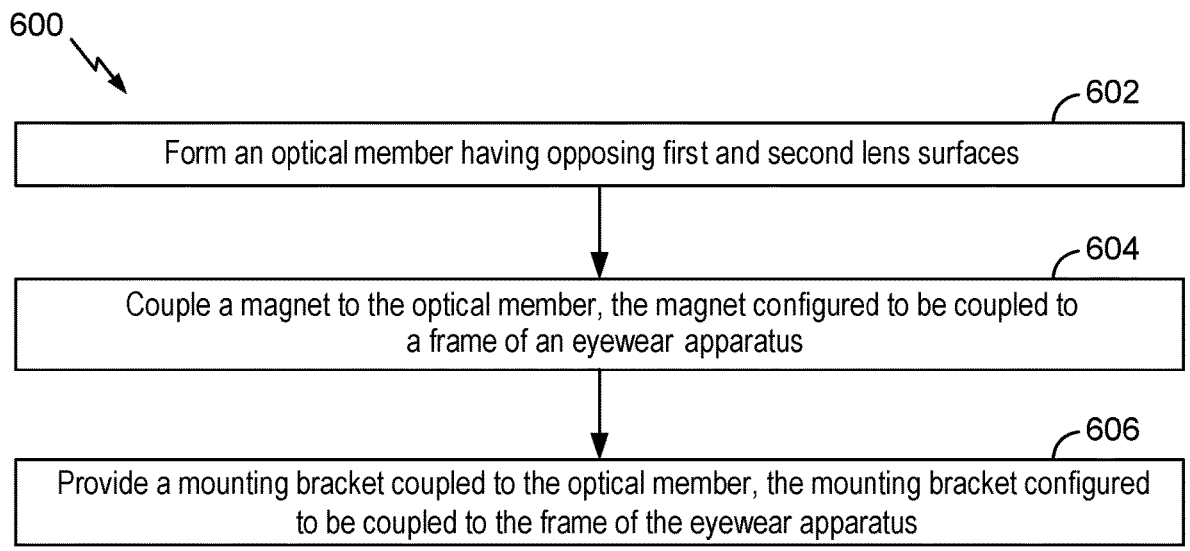
FIG. 6 is a flowchart illustrating an example of a method of forming one or more components of an optical system.

Referring to FIG. 6, an example of a method of forming one or more optical devices is shown. Method 600 may be performed by one or more components of system 500, as non-limiting examples. optical article 101, 200, 300, 470, 480, 490 (e.g., optical members, attachment devices, support structures, extension portions, ledges, etc.) or eyewear apparatus 130, 400

Method 600 includes forming an optical member having opposing first and second lens surfaces, at 602. The optical member may include or correspond to optical article 101, 200, 300, 470, 480, 490. In some implementations, the optical member is a single optical member of an optical article. Additionally, or alternatively, forming the optical member may include molding, casting, surfacing, milling, edging, laser etching, grinding, the like, or a combination thereof, as illustrative, non-limiting examples.

Method 600 further includes coupling a magnet to optical member, the magnet configured to be coupled to a frame of an eyewear apparatus, at 604. For example, the magnet may include or correspond to an attachment device (e.g., 104, 204, 304). In some implementations, the magnet may be attached to a first side of optical member. To illustrate, the magnet may be coupled (e.g., attached and/or implanted) proximate or adjacent to a periphery of a first side of the optical member.

Method 600 includes providing a mounting bracket coupled to the optical member, the mounting bracket configured to be coupled to the frame of the eyewear apparatus, at 606. For example, the mounting bracket may include or correspond to (e.g., 104, 204, 304). In some implementations, providing a mounting bracket coupled to the optical member includes machining a mounting bracket. To illustrate, the mounting bracket may be machined by milling or edging a side surface of optical member.

Although method 600 has been described as including coupling the magnet (e.g., at 604) and providing the mounting bracket (e.g., at 604) one or both of these may optionally be performed or not be performed. In such implementations, method 600 may include coupling one or more attachment devices to the optical member. The one or more attachment devices may include or correspond to a magnet, a mounting bracket, an adhesive, a cavity, a protrusion, a portion of Velcro (e.g., hook and/or loop), a friction device, adhesive, a male/female connectors (e.g., projection or recesses), other fastener (e.g, a pin, hook and loop, or the like), the like, or a combination thereof.

In some implantations, forming the optical member at 602 includes forming the optical member including a first end, a second end, a first lens surface, a second lens surface, and a side surface. Additionally, or alternatively, forming the optical member at 602 may include forming receiving a wafer and forming the optical member from the wafer.

In implementations of method 600, forming the optical member may include machining at least a portion of optical member. To illustrate, machining may include edging, milling, laser etching, or the like. In some such implementations, prior to forming the optical member, method 600 may include tracing a frame (e.g., 432) of an eyewear apparatus or receiving design information (e.g., dimension data) of or corresponding to the frame of the eyewear apparatus.

In some implementations, method 600 may include forming a support structure. The support structure may include or correspond to 260. Forming the support structure may include forming a ring, such as support structure 260 (e.g., a ring). In some such implementations, method 600 may further include forming a channel in a side surface of the optical member. The side surface may be positioned between the first and second lens surfaces. The channel may include or correspond to channel 218. In some such implementations, method 600 may include positioning at least a portion of a support structure within the channel. The optical member may be coupled to the magnet, the mounting bracket, or both, via the support structure. For example, coupling magnet may include coupling the support structure to the optical member. Additionally, or alternatively, providing the mounting bracket may coupling a support structure including the mounting bracket to the optical member. In some implementations, a first support structure may be coupled to the optical member and may be decoupled from the optical member. After the first support structure is decoupled from the optical member, a second support structure may be coupled to the optical matter. The first support structure corresponding to a first eyewear apparatus and may include one or more attachment devices configured to couple with corresponding attachment devices of the first eyewear apparatus. The first eyewear apparatus may be different from a second eyewear apparatus. The second support structure corresponding to the second eyewear apparatus and may include one or more attachment devices configured to couple with corresponding attachment devices of the second eyewear apparatus.

In some implementations of method 600, forming the optical member further includes forming a first portion including a lens including the first and second lens surfaces. In some such implementations, forming the optical member further includes forming a second portion extending from a side surface of the first portion. The side surface may be positioned between the first and second lens surfaces. In some implementations, the first portion and the second portion are formed using a milling machine. In some such implementations, the optical member may be coupled to the magnet, the mounting bracket, or both, via the second portion. To illustrate, the magnet may be coupled to second portion, the mounting bracket may be included in second portion, or both. Additionally, or alternatively, providing the mounting bracket may include forming the mounting bracket from a received wafer from with the optical member is formed.

In some implementations, method 600 may optionally or alternatively include forming the frame of the eyewear apparatus and/or forming the eyewear apparatus. For example, forming one or more portions of the eyewear apparatus may not include forming the optical article and/or may not include forming the optical member. The frame may have a first side and a second side (e.g., a user facing side). In some implementations, forming the frame may include forming or coupling one or more attachment devices. For example, forming or coupling the one or more attachment devices may include coupling a magnet to the second side, forming a cavity, or both. The magnet of the frame may be configured to couple with the magnet of the optical article. The cavity may be configured to receive at least a portion of the mounting bracket of the optical article. In some such implementations, the cavity may be defined by the frame of the eyewear apparatus. Additionally, or alternatively, the cavity may be defined by a nose pad of the frame. In some such implementations, the node pad is coupled to or unitary with the frame.

Thus, method 600 enables the manufacturing of one or more components of an optical system. For example, method 600 enables manufacturing of an optical member that is removably coupleable to a frame of an eyewear apparatus such that a single optical member covers a respective lens of the eyewear apparatus. Manufacturing of such a optical members may allow for manufacturing of optical articles using standard lens processes. Additionally, the optical member may be lightweight, quick and simple to assembly, and provide customization for different users and/or different eyewear apparatuses. For example, an optical member may be customized to correspond to a specific vision prescription of a user and/or or frame type of an eyewear device. Accordingly, an optical member is independent for each eye of a user and it is possible to easily manage very different prescriptions between two eyes of a user.

The above specification and examples provide a complete description of the structure and use of illustrative implementations. Although certain implementations have been described above with a certain degree of particularity, or with reference to one or more individual implementations, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and implementations other than the one shown may include some or all of the features of the depicted implementation. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one implementation or may relate to several implementations.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An optical article for use with an eyewear apparatus, the optical article comprising:
 a single optical member having opposing first and second lens surfaces;
 a magnet coupled to the optical member and configured to be coupled to a frame of the eyewear apparatus; and
 a mounting bracket coupled to the optical member and configured to be coupled to the frame of the eyewear apparatus,
 wherein the eyewear apparatus has one or more lenses coupled to the frame, each of the one or more lenses distinct from the optical member,
 wherein the optical member includes:

a first portion having a lens including the first and second lens surfaces; and a second portion extending from a first side surface of the first portion to a second side surface of the second portion, the first and second side surfaces positioned between the first and second lens surfaces and the first side surface forming, on a frame facing side, a ledge with a third surface connecting the first side surface to the second side surface, the ledge extending along a perimeter of the optical member such that the ledge cooperates with the frame to orient the optical member within the frame, and a depth of the ledge is selected such that the first lens surface is located at a position proximate to a surface of a lens of the eyewear apparatus without contacting the surface of the lens, wherein the second portion being coupled to the magnet and coupled to or includes the mounting bracket, and wherein the mounting bracket is coupled to the second side surface and the magnet is coupled to the third surface.

2. The optical article of claim 1, further comprising:
a support structure coupled to the optical member; and
wherein:
the optical member is coupled to the magnet via the support structure; and
the mounting bracket is coupled to or unitary with the support structure.

3. The optical article of claim 2, wherein:
the optical member includes a channel formed via a side surface of the optical member, the side surface positioned between the first and second lens surfaces; and
at least a portion of the support structure is positioned within the channel.

4. The optical article of claim 2, wherein:
a size, a shape, or both of the support structure is based on one or more characteristics of the frame of the eyewear apparatus.

5. The optical article of claim 1, wherein:
the optical member comprises:
a first portion comprising a lens including the first and second lens surfaces; and
a second portion extending from a side surface of the first portion, the side surface positioned between the first and second lens surfaces; and
the second portion is coupled to the magnet and coupled to or includes the mounting bracket.

6. The optical article of claim 1, wherein:
the optical member comprises a prescription lens; and
the optical member is configured to be coupled to a user facing side of the frame using the magnet and the mounting bracket.

7. The optical article of claim 1, wherein, to couple the optical member to the frame:
the magnet is configured to be positioned in a first cavity of the frame; and
at least a portion of the mounting bracket is configured to be positioned within a second cavity of the frame.

8. The eyewear apparatus configured to couple to the optical member of claim 1.

9. The eyewear apparatus of claim 8, comprising:
the frame having a first side and a second side, the second side is a user facing side, wherein the frame comprises:
a nose pad comprising a cavity configured to receive the mounting bracket of the optical member; and a second magnet coupled to the second side and configured to be coupled with the magnet of the optical member.

10. The eyewear apparatus of claim 1, further comprising:
one or more lenses coupled to the frame, each of the one or more lenses distinct from the optical member; and
wherein the eyewear apparatus is an apparatus select from the group consisting of glasses, spectacles, sunglasses, safety glasses, or goggles.

11. A method of forming one or more optical devices, the method comprising:
forming a single optical member having opposing first and second lens surfaces;
coupling a magnet to optical member, the magnet configured to be coupled to a frame of an eyewear apparatus; and
providing a mounting bracket coupled to the optical member, the mounting bracket configured to be coupled to the frame of the eyewear apparatus,
wherein the eyewear apparatus has one or more lenses coupled to the frame, each of the one or more lenses distinct from the optical member,
wherein the optical member includes:
a first portion having a lens including the first and second lens surfaces; and
a second portion extending from a first side surface of the first portion to a second side surface of the second portion, the first and second side surfaces positioned between the first and second lens surfaces and the first side surface forming, on a frame facing side, a ledge with a third surface connecting the first side surface to the second side surface, the ledge extending along a perimeter of the optical member such that the ledge cooperates with the frame to orient the optical member within the frame, and a depth of the ledge is selected such that the first lens surface is located at a position proximate to a surface of a lens of the eyewear apparatus without contacting the surface of the lens,
wherein the second portion being coupled to the magnet and coupled to or includes the mounting bracket, and
wherein the mounting bracket is coupled to the second side surface and the magnet is coupled to the third surface.

12. The method of claim 11, wherein:
forming the optical member comprises:
receiving a wafer; and
forming the optical member from the wafer, and
providing the mounting bracket comprises:
forming the mounting bracket from the wafer; or
coupling a support structure including the mounting bracket to the optical member.

13. The method of claim 11, further comprising:
forming a channel in a side surface of the optical member, the side surface positioned between the first and second lens surfaces; and
positioning at least a portion of a support structure within the channel; and
wherein the optical member is coupled to each of the magnet and the mounting bracket via the support structure.

14. The method of claim 11, wherein:
forming the optical member further comprises:
forming a first portion comprising a lens including the first and second lens surfaces; and forming a second portion extending from a side surface of the first portion, the side surface positioned between the first and second lens surfaces; and wherein the first portion and the second portion are formed using a milling machine.

15. The method of claim 11, further comprising:

forming the frame of the eyewear apparatus, the frame having a first side and a second side, the second side being a user facing side; and wherein forming the frame comprises:

coupling the magnet to the second side; and forming a cavity in a nose pad of the frame, the cavity configured to receive at least a portion of the mounting bracket of the optical member.

* * * * *